(12) United States Patent
Lass (10) Patent No.: US 8,226,380 B2
(45) Date of Patent: Jul. 24, 2012

(54) CHAMBER, PUMP HAVING A CHAMBER AND METHOD OF MANUFACTURING CHAMBERS

(75) Inventor: Joseph Lass, Munich (DE)

(73) Assignee: PARItec GmbH, Starnberg (DE)

( * ) Notice: Subject to any disclaimer, the term of this patent is extended or adjusted under 35 U.S.C. 154(b) by 747 days.

(21) Appl. No.: 12/339,432

(22) Filed: Dec. 19, 2008

(65) Prior Publication Data

US 2009/0158923 A1 Jun. 25, 2009

(30) Foreign Application Priority Data

Dec. 21, 2007 (DE) .......................... 10 2007 061 920

(51) Int. Cl.
*F04B 17/00* (2006.01)

(52) U.S. Cl. ........................................ 417/322; 417/558

(58) Field of Classification Search .................. 417/322, 417/558, 413.2; 361/699, 701; 165/104.31
See application file for complete search history.

(56) References Cited

U.S. PATENT DOCUMENTS

| | | | |
|---|---|---|---|
| 3,606,592 | A | 9/1971 | Madurski et al. |
| 5,632,841 | A | 5/1997 | Hellbaum et al. |
| 6,033,191 | A | 3/2000 | Kamper et al. |
| 2006/0027772 | A1 | 2/2006 | Richter et al. |
| 2006/0232167 | A1* | 10/2006 | Jordan .......................... 310/324 |
| 2006/0245949 | A1* | 11/2006 | Ball .......................... 417/413.2 |

FOREIGN PATENT DOCUMENTS

| | | |
|---|---|---|
| DE | 33 20 443 A1 | 12/1984 |
| DE | 41 40 533 A1 | 6/1993 |
| DE | 19720482 A1 | 11/1998 |
| DE | 10238585 B3 | 4/2004 |
| EP | 0 025 005 A1 | 3/1981 |
| WO | WO 02/28532 A2 | 4/2002 |
| WO | WO 2004/081390 A1 | 9/2004 |

OTHER PUBLICATIONS

Löschner et al., "Laser Beam Forming of Silicon", Laserinstitut Mittelsachsen e.V., Lasermagazin May 6, 2003, p. 47.
Extended Search Report dated Mar. 31, 2009 from European Application No. 08172351.

* cited by examiner

*Primary Examiner* — Anne Hines
(74) *Attorney, Agent, or Firm* — Wolf, Greenfield & Sacks, P.C.

(57) ABSTRACT

The invention relates to a chamber, in particular a pump chamber, comprising a plate-shaped first half (10) and a plate-shaped second half (12). The first and second halves are connected to one another by a closed connecting seam (20) in a surface-to-surface relation, and at least one half has at least one aperture (14) lying within the connecting seam. Furthermore, at least the second half is thermally deformed within the closed connecting seam in such a manner that it is formed to bulge relative to the connecting surface with the first half such that a hollow space (30) is formed between the first and second halves. In a second aspect, the invention relates to a pump having a configuration as described above. In a third aspect, the invention relates to a method for producing a chamber as described above.

13 Claims, 6 Drawing Sheets

CHAMBER, PUMP HAVING A CHAMBER AND METHOD OF MANUFACTURING CHAMBERS

The present invention relates to a chamber, in particular pump chamber, having two halves, of which at least one is provided with an aperture and between which a hollow space is formed. Furthermore, the present invention relates to a method for producing such a chamber and a pump containing such a chamber. The chamber of the present invention is particularly suited for use in micro-pumps.

During development, chambers with the above configuration were examined, in which the halves were produced of synthetic material by an injection molding method. The connection of the halves is carried out in this case by adhesion or clamping. Depending on the use of such a chamber (e.g. as pump chamber in a micro-pump), considerable dynamic forces can act on the chamber halves, in particular on the connection thereof. This strain places high demands on the resilience of the synthetic material and requires, where there is an adhesive connection, a broad adhesive edge joint.

The present invention is based on the object to create a chamber with increased stability which can be used in particular as a pump chamber in a pump, and a method for a simple and cost-effective production of the chamber.

This object is solved by a chamber, by a pump and by a method as described and claimed herein.

The chamber of the invention comprises a first half and a second half, the first and the second halves being connected to one another by a closed connecting seam in a surface-to-surface relation, and at least one of the two halves having at least one aperture lying within the connecting seam. At least the second half is thermally deformed within the closed connecting seam in such a manner that it is formed to bulge relative to the connecting surface with the first half such that a hollow space is formed between the first and second halves. The first and second halves are here in particular plate-shaped, i.e. a body, the lateral dimensions of which along a plane are larger than the extension thereof in a direction perpendicular to the plane at any point of the plane, said perpendicular extension not having to be consistent along the plane. The hollow space formed between the two halves can be used for the intake, storage and release of fluids, gases or multiphase solutions which can be taken in or released via the aperture. Depending on the use of the chamber (e.g. as filter, storage means or for the generation of aerosols), filter members (e.g. in the form of powder or membrane) or storage members (e.g. sponges) can be contained in the hollow space. Furthermore, the hollow space can serve as a resonating cavity or shelter for a sensor member accommodated therein (e.g. for measuring pressure variations). The bulge of the second half is achieved by thermal deformation, i.e. by specific application of heat. Thus, the desired deformation can be carried out by the connecting operation or, in addition, by a separate deformation step carried out after the connection of the two halves. Since this technique can also be applied to materials with a high degree of hardness, such as metals, it is possible to form the second half of a hard material, and thus to guarantee an increased stability and rigidity of the chamber. This is particularly important if the chamber is used as a pump chamber, e.g. in a micro-pump, since in this case considerable dynamic forces act on the first chamber half. Depending on the use of the chamber, the first half can be formed to be flat, i.e. without significant elevations and depressions (e.g. when used as a pump chamber), or bulged within the closed connecting seam relative to the connecting surface with the second half (e.g. when used as a container or filter), by which the volume of the hollow space is increased. This bulge can be achieved e.g. by thermal deformation (as in case of the second half) or by deep-drawing.

In a preferred embodiment of the present invention, the connecting seam of the first and second chamber halves is a weld seam, preferably a laser weld seam. This enables a stable connection of the two halves and a reliable tightness of the hollow space formed therebetween. Thus, no additional sealing materials are necessary, which simplifies the production of the chamber. Due to the heat applied purposely to both chamber halves during the welding process, a bulge of both halves is moreover achieved. Since with this the degree of thermal deformation depends significantly on the radial shrinkability, and thus on the flexibility of the chamber halves, the bulge can be controlled by the hardness or thickness of the selected material. Material hardness and/or material thickness can be selected differently for the two chamber halves, e.g. such that the second half is considerably more deformed than the first. Depending on the volume and form of the desired hollow space a further, separate deformation step is thus possibly unnecessary, which simplifies the production of the chamber. Furthermore, running of the adhesive, e.g. into the hollow space, which can occur in adhesive connections, and thus a contamination of the chamber is prevented. In particular laser welding enables a point-by-point exact guidance of the weld seam, even in complex seam contours. Furthermore, this technique allows for a narrow width of the weld seam, and thus a maximum volume of the hollow space with a given outer diameter and/or outer circumference of the closed seam, and leaves the welded material unaltered on the interior side thereof, such that possible chemical reactions, such as oxidation, are avoided. In addition, the connecting process of the two chamber halves can easily be automatized, which enables a faster and more efficient production.

In a further preferred embodiment, the second half has at least one deformation seam which lies within the connecting seam and can be formed to be closed or open. Thus, a uniform deformation of the second chamber half, and thus a precise control of the volume of the hollow space is guaranteed. The deformation seam only leads to a material degeneration (but not to a material deterioration) of the second half, but not to a connection with the first half. While the individual deformation seam is normally sufficient for the formation of a controlled bulge of the second half, a plurality of deformation seams can also be formed, e.g. if a more complex bulging profile is desired, depending on the intended use of the chamber.

In one embodiment of the invention, the chamber has at least one closed deformation seam.

In a further embodiment of the invention, the chamber has at least one open-formed deformation seam. The deformation seam can be arranged thereby e.g. circumferentially or radially.

Furthermore, a combination of a plurality of deformation seams is possible, where e.g. some of the deformation seams can be formed to be closed and some can be formed to be open. The deformation seams can be straight, curved or both.

Preferably, the at least one deformation seam is a laser shaping seam. By laser shaping, the heat can be applied locally, at exactly defined locations of the second chamber half, which enables a precise regulation of the material deformation, and thus an exact control of the volume of the hollow space. After completing the deformation process, the volume of the hollow space can be measured, and, if necessary, deformation corrections can be carried out by further laser shaping until the desired volume is reached. This technique can also be applied to hardened metals, e.g. hardened spring steel sheets, and thus allows a maximization of the stability of the chamber.

The first and second chamber halves have a thickness perpendicular to the surface thereof, the thickness of the first half preferably being less than that of the second half. This configuration is particularly advantageous if the chamber is used as a pump chamber, e.g. in a micro-pump. In this case, the thickness of the second half can be selected to be large enough to guarantee a sufficient stability against the occurring dynamic forces. The thickness of the first half can be selected as less to achieve an increased flexibility (with sufficient stability), and thus preferably enable an elastic deflection of the first half, relative to the second half, in the direction perpendicular to the surface thereof (by applying an external force). By such a deflection, the volume of the hollow space formed between the first and second chamber halves can be increased or reduced, depending on the deflection direction of the first half, by which negative pressure or overpressure is correspondingly generated in the chamber. In this manner, fluids, gases or multiphase solutions can be taken into the chamber or released therefrom, i.e. by using the first half as a pump membrane the chamber can be used as a pump member. The deflection is carried out thereby elastically, i.e. the first chamber half returns to its original position when an external force is no longer applied thereto. Thus, it is possible to exert the external force for the deflection of the first half in one direction only, and to use the reset force of the first half for a deflection movement in the opposite direction. The hollow space could be compressed, for example, by pushing the first half in the direction of the second half, and would independently expand again after omission of the externally applied force until it has reached its original volume. Such a configuration enables a simplified design of the pump and facilitates the production thereof. When using the chamber as a storage means, e.g. as fluid storage means, a storage member (such as a sponge) contained in the hollow space can moreover be compressed by a controlled deflection of the first chamber half, such that a part of the fluid stored in the chamber (or the entire stored fluid) can be released to the outside via the aperture of the chamber.

In a further preferred embodiment, the bulge of the second half is adjusted to the maximum deflection of the first half. Thus, a high compression ratio is achieved, facilitating high transport ratios, improved back-pressure abilities and an increased tolerance vis-à-vis gas bubbles. Since the maximum deflection of the first half is relatively low (typically several hundred µm), such an adjustment presupposes an exact and controlled deformation of the second chamber half, which is made possible by the present invention.

Preferably, the first half is connected to a piezoelectric member with which the deflection of the first half can be controlled. In this manner, the deflection can be altered simply by applying a predetermined voltage to the piezoelectric member. The piezoelectric member can be used here in a bipolar manner, i.e. by applying a positive or negative voltage the first half is deflected in one of two opposite directions, or in a unipolar manner, i.e. a positive or negative voltage is exclusively applied such that the first half is deflected in a certain direction by the piezoelectric member, and the deflection in the opposite direction is carried out by the reset force of the first half. While the latter configuration enables a simpler design of the pump, the displacement of the pump can be increased in the first configuration. Thus, the configuration of the pump can be modified depending on the field of use of the pump.

In a further preferred embodiment, the first half and/or the second half consists of metal, preferably of steel. Such a configuration makes a stable construction of the chamber possible, which is particularly advantageous when using the chamber as a pump chamber, e.g. in a micro-pump. In this case, as already described above, not only is a high stability of the second chamber half important, but also of the first chamber half. When using the chamber as a pump chamber, the first half is continuously elastically deformed by deflection, which can lead to signs of wear, and consequently to a deterioration of the elastic properties or even to damage, such as ruptures. By using metals, in particular steel, as material for the first chamber half, an extended durability of the pump can thus be guaranteed. Moreover, steel in particular has the advantage that it is biocompatible and toxicologically harmless such that a contamination of the fluid present in the chamber (or of the gas or the solution) can be excluded. Steel is a material widespread in industry that has been thoroughly studied as to process technology, which is reasonably priced and can be effectively processed with conventional techniques. In particular, steel has a smooth surface, which facilitates the production of the chamber.

If the chamber is used as a pump chamber, a valve is preferably arranged in fluid connection with the aperture of the second half. The valve can be located in or at the aperture or can be connected thereto via a line (e.g. a hose). Thus, the influx and efflux of fluids, gases or solutions into or out of the chamber can be accurately controlled. The valve can be designed hereby as single-valve, double-valve (in particular when using the chamber as a pump chamber) or three-way valve.

The invention further also comprises a pump having a chamber configured as described above. Many of the advantages such a chamber has when being used as a pump chamber, have already been described in detail above. In particular, the exact control of the hollow space volume, possible with the present chamber, allows a reliable construction of chambers with small volumes down to several µl. The chamber configured according to the invention is thus ideally suitable as a pump chamber for micro-pumps. The closed connecting seam forming the pump chamber can be contoured thereby in such a manner that a plurality (e.g. three) of chamber segments connected via passages are formed.

Preferably, the pump comprises a plurality of the above-described chambers, at least two of the chambers being in fluid connection with each other. The chambers can hereby be connected in series or parallel to one another, in order to achieve an increase of the displacement and/or the back-pressure capability. In this case, the different chambers can each contain one or a plurality of valves as well as one piezoelectric member each. When operating the pump, a control of the valves and the piezo members can be adjusted to each other, e.g. by an electric circuit, in order to guarantee an ideal operation of the pump process.

Further (microfluidic) components, such as hoses, tubes, etc. can be mounted by adhesion or clamping and sealing at the pump or directly at the chamber. The object of the invention is solved, as mentioned, also by a method for producing a chamber comprising the following steps: producing a plate-shaped first half and a plate-shaped second half, connecting surface-to-surface the first and second halves to one another by a closed connecting seam, and deforming the second half connected to the first half, in order to form a hollow space between first and second halves. The plate-shaped halves can hereby be produced e.g. by punching, etching or cutting from sheet metal. Since the deformation is carried out with or after the connection of both halves with each other, the two halves can essentially be laid flat in abutment with each other during the connecting process. This simplifies the connecting process and thus facilitates the production of the chamber.

The method can further comprise a step in which at least one of the two halves is provided with an aperture, the connecting seam later surrounding the aperture. The step for forming the aperture is hereby carried out prior to the connection of the two chamber halves to one another.

In a preferred embodiment, the connection of the first and second halves to one another is carried out by welding, preferably by laser welding.

In a further preferred embodiment, the deformation of the second half is carried out by thermal deformation, preferably laser shaping. In particular, laser shaping makes it possible to apply heat locally at exactly defined locations of the second chamber half, and thus to carry out the deformation step simply and effectively after the connection step of the two halves to one another. By alternating laser shaping and measurement of the volume of the hollow space formed between the two halves, the deformation process can be carried out so long until the desired volume of the hollow space is reached.

In a further preferred embodiment, the first chamber half and/or the second chamber half consists of metal, preferably of steel.

Preferably, both chamber halves are each fitted or integrated into frames via webs. The frames (e.g. punching frames) which can be present in the form of "endless sheets", make an exact positioning of the chamber halves to one another possible and facilitate the supply thereof to machining processes such as e.g. the connection process or the deformation process. The webs are preferably selected to be flexible such that, on the one hand, the frames are not influenced by the deformations of the chamber halves that occur during machining, and essentially keep their original form. On the other hand, it is thus achieved that the deformation of the chamber halves is "decoupled" from the frames by the flexible webs, by which an unimpeded deformation of the halves without impairment by the frames is made possible. In a consecutive step, the chambers can be detached from the frame by cutting through the webs.

Hereinafter, the present invention will be described, merely by way of example, on the basis of the attached figures, FIG. 1 showing a perspective view of a plurality of second chamber halves according to a preferred embodiment.

Figure 1:
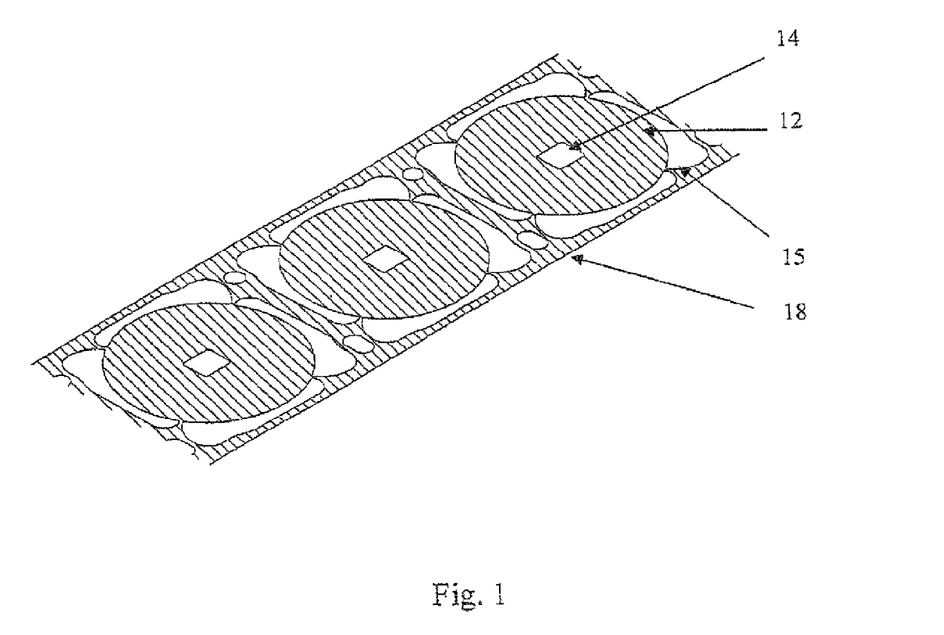
Figure 2:
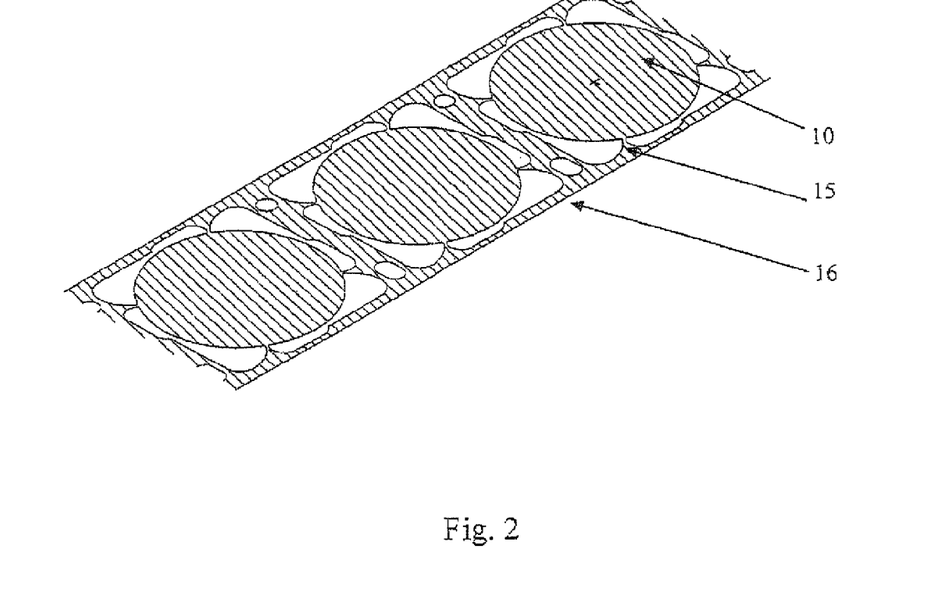
FIG. 2 showing a perspective view of a plurality of first chamber halves according to the same preferred embodiment.
Figure 3:
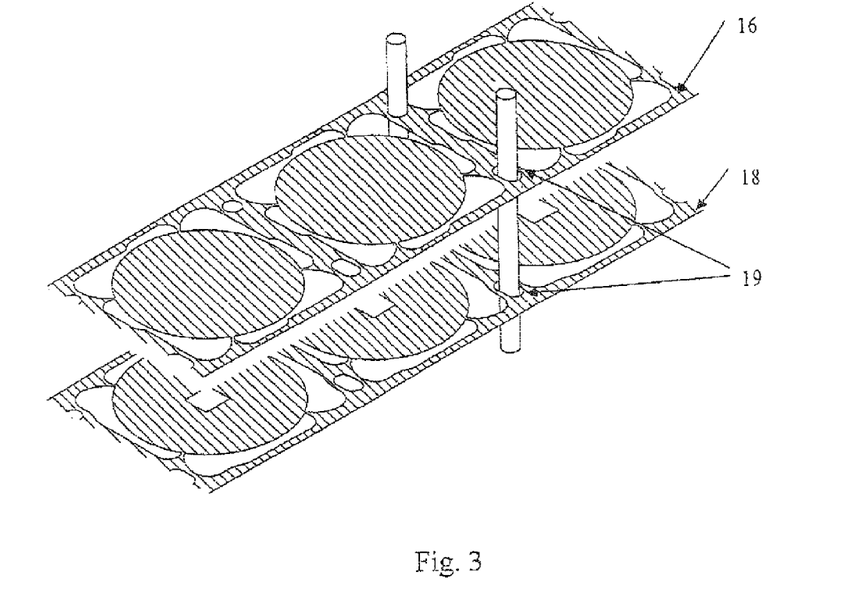
FIG. 3 showing a perspective view of the first and second chamber halves during a positioning step prior to the connection step according to the same preferred embodiment.

FIG. 1 shows a perspective view of a plurality of second chamber halves 12 according to the invention with apertures 14 (intermediate product) according to a preferred embodiment, which were produced by punching from a high-grade steel sheet and are connected to the punching frame 16 via narrow webs 15. The halves 12 are formed in a flat and round manner and have a thickness of 0.3 mm as well as an outer diameter of 30 mm. The aperture 14 is formed like a square having a side length of 6 mm. In further preferred embodiments, the thickness and the diameter of the second half 12 typically lie within a range of 0.2-0.6 mm and 10-50 mm, respectively. The form of the aperture 14 can be selected arbitrarily and can, for example, be adjusted to the form of the valve to be inserted. The aperture 14 can, for example, be rectangular, triangular, oval or circular, having diameters typically in a range of 1-15 mm.

Figure 4:
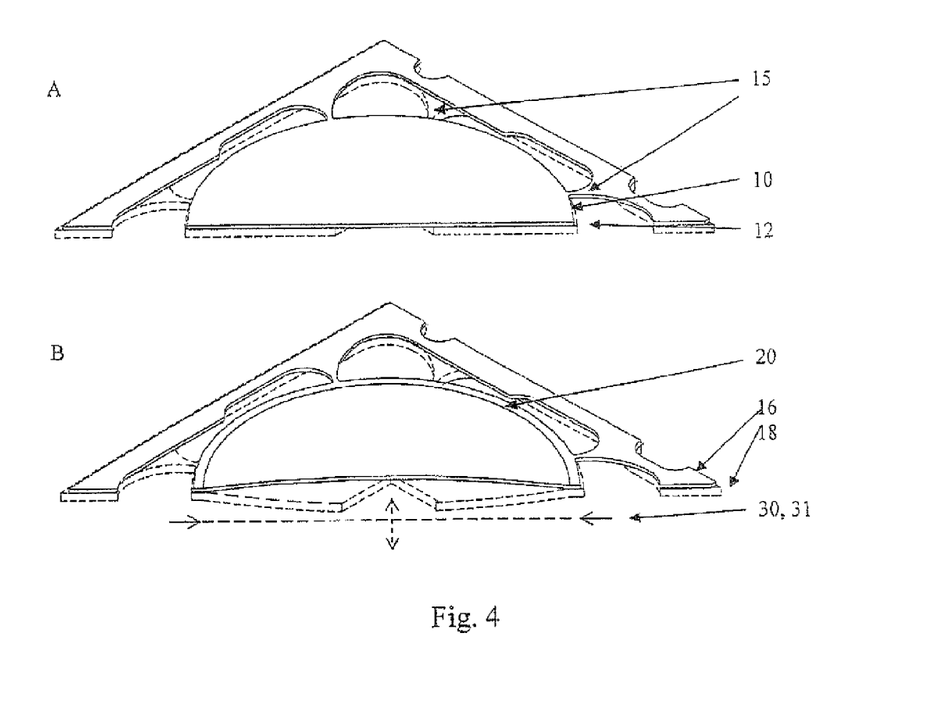
FIG. 4A showing a cross-sectional view of a first chamber half abutted to a second chamber half prior to the connection step according to the same preferred embodiment.
FIG. 4B showing a cross-sectional view of the chamber halves shown in FIG. 4A after the connection of the chamber halves has been carried out.

FIG. 2 shows a perspective view of a plurality of first chamber halves 10 (intermediate product) according to the same preferred embodiment as shown in FIG. 1. The first halves 10 were also produced by punching from a high-grade steel sheet, are connected to the punching frame 18 via narrow webs 15, and, like the second halves 12, are formed in a flat and round manner with a thickness of 0.1 mm (typical range 0.05-2 mm) and a diameter of 30 mm (typical range 10-50 mm). While the first 10 and second 12 halves have identical diameters in the present embodiment, the diameters of the two halves 10, 12 can be selected differently from each other in further preferred embodiments. The diameter of the first half 10 can, for example, be larger than the diameter of the second half 12. As shown in FIGS. 1 and 2, the first 10 and second 12 chamber halves in the present embodiment are held in punching frames 18 and 16 via webs 15, which simplifies the connection of the two halves 10, 12. For this process step, both punching frames 16, 18 are simply placed exactly on top of each other, by which also at least one first half 10 contained in frame 16 and one second half 12 contained in frame 18 lie exactly on top of each other. As shown in FIG. 3, the positioning of the chamber halves 10, 12 to one another can hereby be effected by index holes 19 provided in the frames 16, 18. In a further preferred embodiment of the invention, the punching frames 16, 18 can also be configured as endless sheets, which simplifies the automatization of the machining processes.

FIG. 4A shows a cross-sectional view of a first chamber half 10 placed exactly on top of a second chamber half 12 prior to the connection step. Next, the two halves 10, 12 lying on top of each other are laser-welded to one another from the side of the first half 10. In further preferred embodiments, this connection step can also be carried out from the side of the second half. Since the connected halves 10, 12 are removed from the frames 16, 18 only after the deformation step of the second half 12 is completed, i.e. when the chamber forming process has been concluded, an automatization of the production process is facilitated.

FIG. 4B shows a cross-sectional view of the first 10 and second 12 chamber halves (intermediate product) shown in FIG. 4A and connected to one another by laser welding. A CW fiber laser was used for laser welding, having a wavelength of 1064 nm (typical range 800-1200 nm), a power of

100 W (typical range 50-200 W) and a focused laserspot diameter of 30 μm (typical range 20-40 μm), other lasers also being suitable for metal processing. The lateral beam velocity during the welding process was 300 mm/sec (typical range 200-600 mm/sec).

The laser weld seam 20 is formed in a circular manner and has a diameter of 28 mm (typical range 10-15 mm, depending on the dimensions of the two chamber halves 10, 12). As can be seen from FIG. 4B, a first deformation (and thus a bulge) of both chamber halves 10, 12 is already effected during the welding process. A hollow space 30 is thus formed between the two chamber halves 10, 12. The bulge of the chamber halves 10, 12, is at the same time related to a minor contraction of the halves 10, 12 in the radial direction (shrinking). Since the webs 15 are formed to be narrow and flexible, the deformations of the chamber halves 10, 12 do not have any influence on the punching frames 16, 18, and therefore these keep their original form. In other words, the webs serve as suspension for the chamber halves in the punching frames 16, 18. On the other hand, the "decoupling" of the deformation of the chamber halves 10, 12 from the frames 16, 18 by the narrow and flexible webs 15 allows the halves 10, 12 to be able to be deformed reliably and without impairment by the frames 16, 18. Otherwise, the frames could also be deformed during the deformation of the halves, and thus become rigid.

Figure 5:
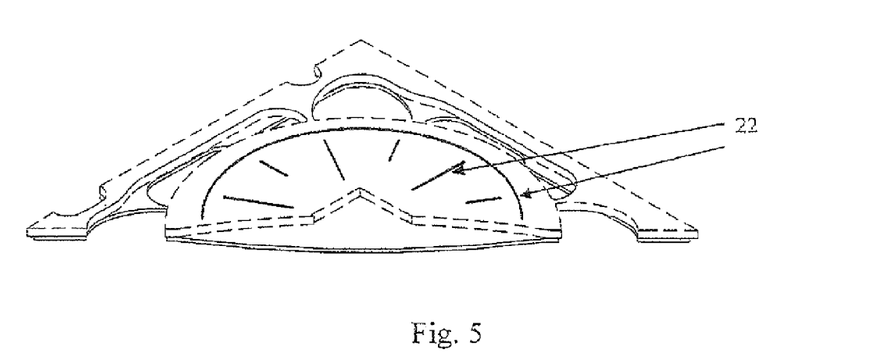
FIG. 5 showing a cross-sectional view of the chamber halves shown in FIG. 4B after the additional thermal deformation of the second chamber half by deformation seams has been carried out.
Figure 6:
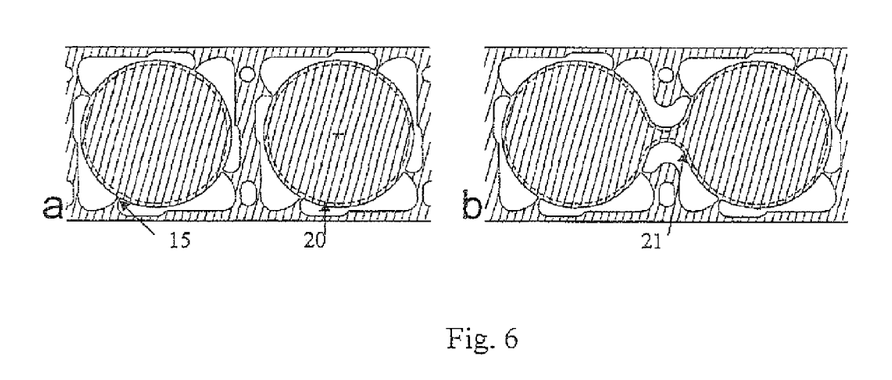
FIGS. 6a and 6b showing plan views of chambers contained in punching frames and having different embodiments.

After the laser welding of both halves 10, 12 has been carried out, the second half 12 is deformed by laser shaping. Thus, a further and in part larger bulge of the second half 12 can be achieved. FIG. 5 shows a cross-sectional view of the first 10 and second 12 chamber halves connected to one another, after the deformation of the second chamber half 12, according to the present embodiment. For this deformation step which was carried out from the side of the second half 12, the same laser has been used as for the welding step having the above-described configuration (in further embodiments the parameters of the laser can vary within the above-described ranges). The laser shaping was carried out at a lateral beam velocity of 600 mm/sec (typical range 100-800 mm/sec) and with a focused laser spot having a diameter of 50 μm (typical range 40-80 μm). For further information regarding the technique of laser shaping, reference is made to the document "*Flexible Formgebung von Blechen durch Laserstrahlumformen*", dissertation by Thomas Hennige, Erlangen, 2001, ISBN 3-87525-140-7. As apparent from FIG. 5, the second chamber half 12 has a closed, circular deformation seam 22 and a plurality of open, radially arranged and linear deformation seams 22 of different lengths. In a further preferred embodiment, an arbitrary number of deformation seams 22 with arbitrary shapes (e.g. oval or like the connecting seam 21 shown in FIG. 6b) can be selected, a bulge of the second chamber half 12 also being able to be achieved by a single seam 22. The diameters (or lateral dimensions in general) of closed deformation seams 22 typically lie in the range of 15-50 mm, inter alia depending on the dimensions of the chamber halves 10, 12. In the present embodiment shown in FIG. 5, a bulge of the second chamber half 12 is achieved by laser shaping, having a maximum bend of approximately 400 μm (typical range 100-500 μm), by which a hollow space is created between the two chamber halves 10, 12, having a volume of approximately 30 μl (typical range 5-100 μl). After the laser shaping step, the production process of the chamber is concluded and the finished chamber can be removed from the punching frames 16, 18 (cutting through the webs) or be supplied to further assembly processes. FIGS. 6a and 6b show plan views of chambers of different embodiments, integrated into punching frames 16, 18, the configuration represented in FIG. 6a corresponding to the configurations shown in FIGS. 4B and 5. The embodiment shown in FIG. 6b, in which the two chambers are in fluid connection with each other via a narrow connection is advantageous in particular for use in pumps, preferably micro-pumps. Other chamber geometries are also conceivable.

Figure 10:
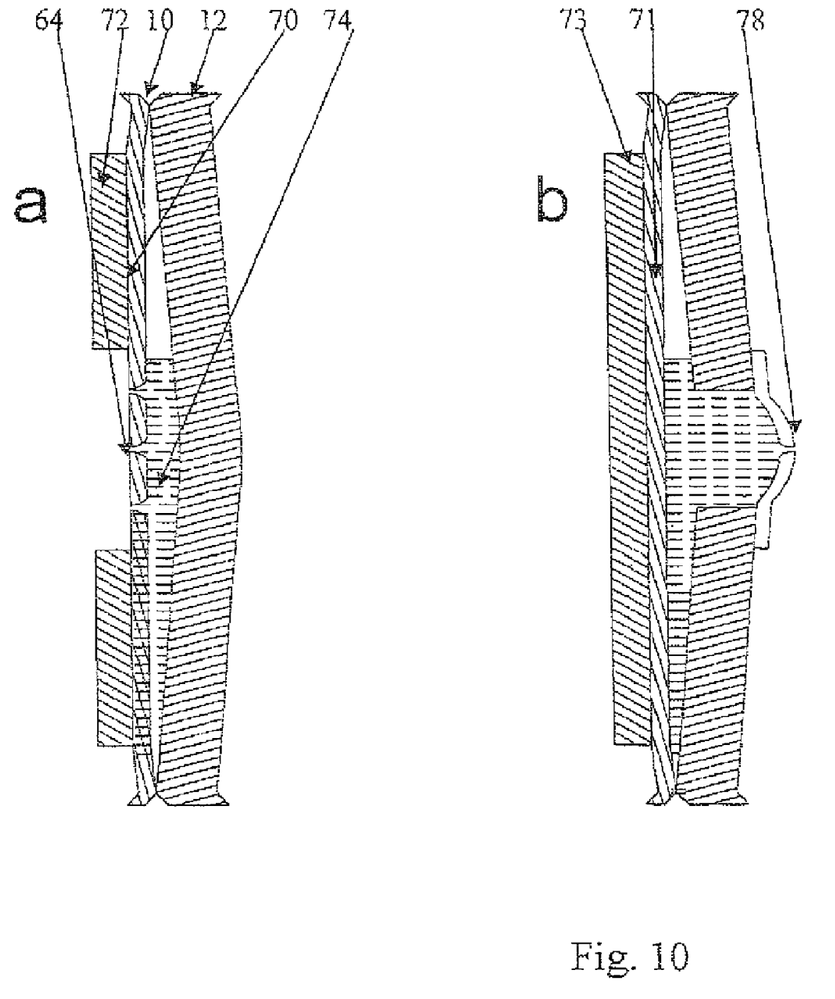
FIGS. 10a and 10b showing cross-sectional views of chambers of different embodiments for the generation of aerosols.

To use the chamber as a pump chamber, e.g. in a micropump, the chamber can be provided with a valve, not shown, which is in fluid connection with the aperture 14. The valve can be mounted, for example, in or at the aperture 14; or can be connected thereto via a line (e.g. a hose). The valve used can be a check valve, e.g. of Si, metal or synthetic material. The valve can be mounted in or at the aperture 14 e.g. by adhesion or clamping and sealing. On the other hand, it is also possible to use the chamber as a pump chamber, e.g. for generating an oscillating pressure, without incorporating an additional valve. When using the pump as a pump chamber, a piezoelectric member can moreover be mounted on the outer surface of the first half 10 of the chamber. The piezo member can be formed thereby in different shapes, e.g. as a disc or ring, and can be connected to the chamber in different ways, e.g. by adhesion. Realizing the piezo member as a ring is in particular favorable when both chamber halves 10, 12 are provided with apertures 14, e.g. when using the chamber as a filter, or in general when an aperture 14 is provided on the chamber half 10, 12 provided with the piezo member, e.g. when using the chamber for the generation of aerosols (see FIG. 10a). In this case, the piezo ring can be arranged around one of the apertures 14 such that an unimpeded fluid intake or fluid outlet through the respective aperture 14 is possible. Furthermore, the arrangement of the piezo member can be selected differently, relative to the weld seam 20, e.g. the weld seam 20 can lie within the piezo ring, depending on the configuration of the chamber.

Figure 7:
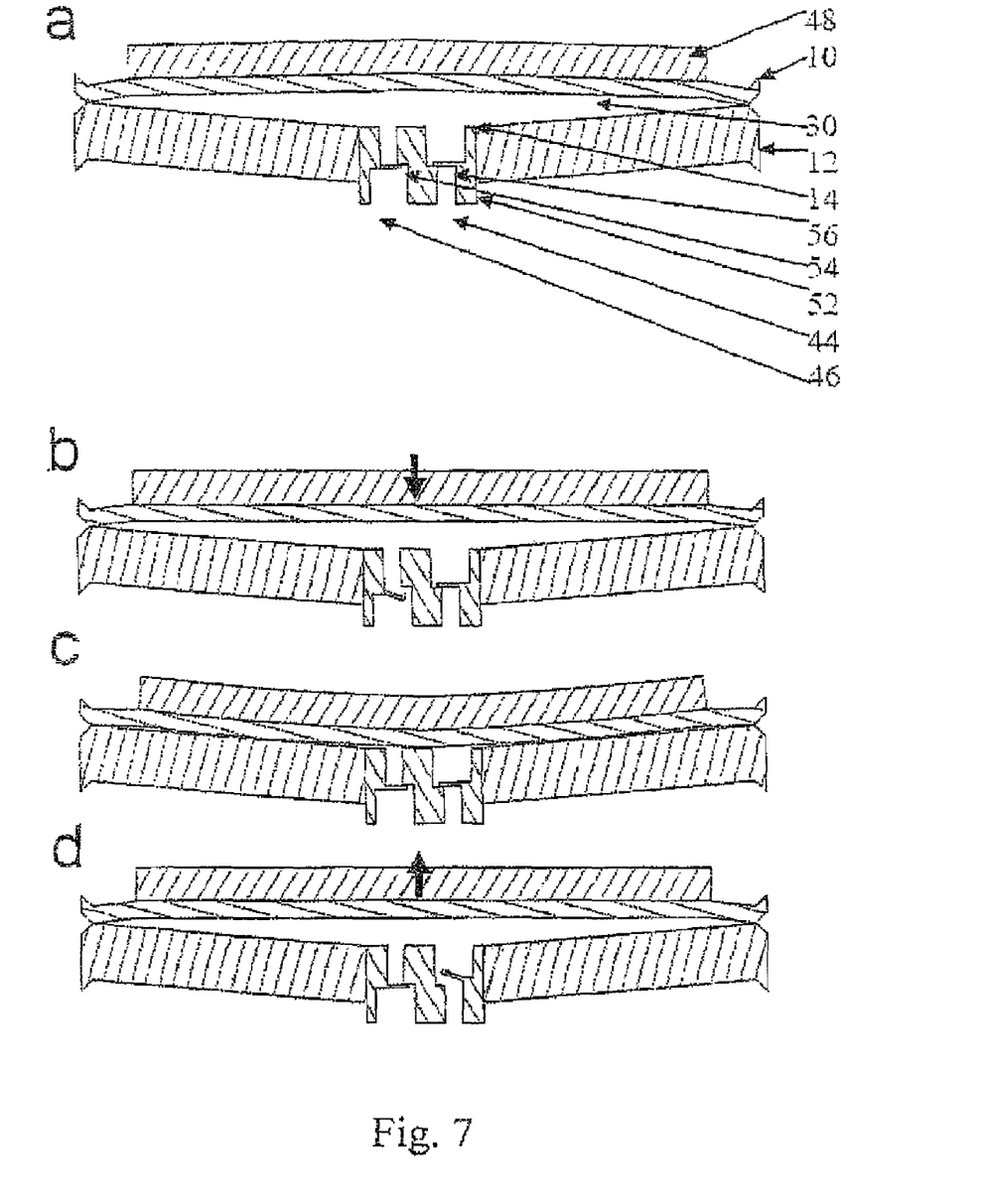
FIGS. 7a to 7d showing cross-sectional views of a micro-pump according to a first embodiment in different phases of the pumping process.

FIG. 7a shows a cross-sectional view of a micro-pump according to a first embodiment of the invention. The micropump comprises a pump chamber consisting of a steel sheet, with a first chamber half 10 and a second chamber half 12 of the embodiment shown in FIGS. 1 to 6a. The thicknesses of the chamber halves 10, 12, as well as the dimensions of the other components are shown out of proportion in FIG. 7. A disc-shaped piezoelectric member 48 is arranged on the outer surface of the first chamber half 10, which is connected to a voltage source via an electric connection not shown, and is applied in a bipolar manner in the present embodiment. A double valve 52 is provided in the aperture 14 of the second chamber half 12, containing a first 56 and a second 54 reed member. These two reed members are arranged in such a manner since they serve as check valves in the intake passage 44 and the outlet passage 46, respectively. When both reed members 54, 56 are in their original position, the valve is closed. The first reed member 56 can only be elastically deflected in the direction of the aperture 14 of the chamber (a fluid passage between the intake passage 44 and the chamber aperture 14 being formed by the deflection) and the second reed member 54 can only be elastically deflected in the opposite direction (a fluid passage between the chamber aperture 14 and the outlet passage 46 being formed by the deflection). Thus, a fluid (or a gas, a solution) can only stream into the chamber through the intake passage 44 and stream out of the chamber only through the outlet passage 46. In the configuration shown in FIG. 7a, a voltage of a certain polarity is applied to the piezo member 48 and the double valve 52 is closed.

During the further operation of the micro-pump, the polarity of the voltage applied to the piezo member 48 is reversed by the voltage source not shown, by which the first chamber half 10 is deflected in the direction of the second chamber half 12 (see FIG. 7b). Thus, the volume of the hollow space 30 formed between the two chamber halves 10, 12 is reduced, and overpressure is generated in the pump chamber. This overpressure effects that the second reed member 54 is deflected in the direction of the outlet aperture 46 and the fluid (or the gas, the solution) contained in the chamber is transported out of the hollow space 30 through the outlet aperture 46. If the first chamber half 10 is fully deflected, as shown in FIG. 7c, no more fluid is contained in the chamber. The pressure applied by the first half 10 drops to 0 and the second reed member 54 returns to its original position such that the double valve 52 is closed. If the polarity of the voltage applied to the piezo member 48 is now reversed again, the first chamber half 10 returns to its original position, as shown in FIG. 7d, by which the volume of the hollow space 30 is increased and a negative pressure is generated in the chamber. The first reed member 56 is deflected in the direction of the chamber aperture 14 by this negative pressure, and fluid (or gas, solution) is transported into the chamber 30 through the intake aperture 44. By periodic reversal of the polarity of the voltage applied to the piezo member 48, fluid (or gas, solution) is thus constantly transported from the intake passage 44 into the hollow space 30 and from the hollow space 30 into the outlet passage 46, i.e. the pump is in pumping mode.

Figure 8:
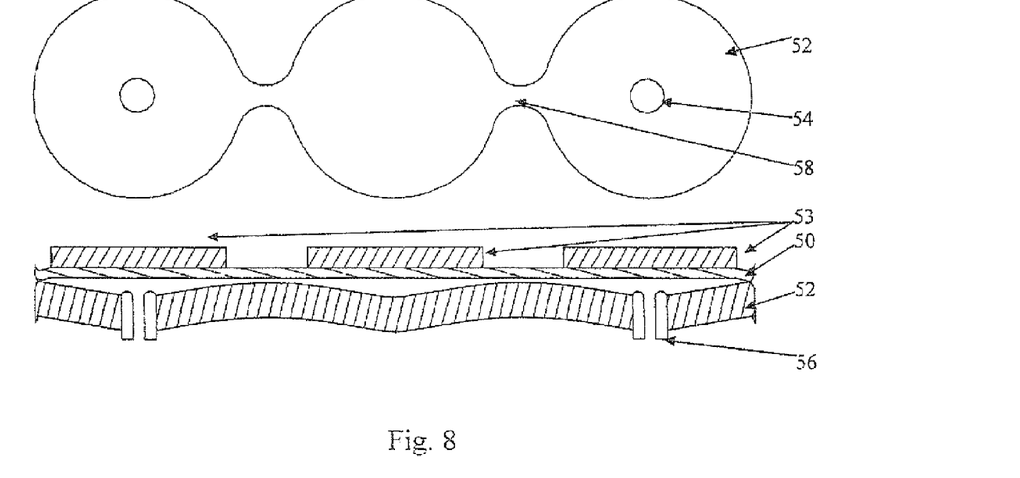
FIG. 8 showing a bottom view of a three-part chamber (top) according to the invention and a cross-sectional view of a micro-pump according to a second embodiment, using the three-part chamber as a pump chamber (bottom)

FIG. 8 shows a bottom view of a three-part chamber (top) according to the invention and a cross-sectional view of a micro-pump according to a second embodiment, using the three-part chamber as pump chamber (bottom). The chamber comprises a first 50 and a second 52 half, each having three round segments and connected to one another and thermally deformed as explained above and illustrated on the basis of FIGS. 1 to 6. The two outer marginal segments of the second half 52 each have an aperture 54 which is provided with a valve seat 56 for the use of the chamber as pump chamber in the micro-pump shown in FIG. 8 (bottom). Furthermore, one independently drivable actuator 53 (e.g. a piezo member) is provided on each of the three segments of the first chamber half 50, with which the deflection of the respective segment can be controlled. By operating the outer actuator 53 mounted to the marginal segments, the respective segment of the first half 50 can be brought into contact with the corresponding valve seat 56 such that no fluid intake or fluid outlet is possible through the respective aperture 54 (i.e. the valve is closed). This contact can be released again by reverse operation of the corresponding actuator 53 (e.g. by reversing the polarity of the applied voltage when using the piezo member as actuator 53), by which the valve is opened. Furthermore, both marginal segments of the chamber are in fluid connection with the central segment via short passages 58. These passages 58 are created during the connection and deformation of the two chamber halves 50, 52 (contoured connecting seam), and thus do not require a separate production step. When operating the micro-pump shown in FIG. 8 (bottom), the actuator 53 mounted to the central chamber segment is used for suction and displacement of fluid in the hollow space formed between the two chamber halves 50, 52. The fluid intake is carried out via one of the two apertures 54, while the other aperture 54 is held closed by means of the corresponding actuator 53. During fluid release, the two marginal actuators 53 are operated in a reverse manner such that the aperture 54 held open during fluid intake is closed and the aperture 54 held closed during fluid intake is opened. By a temporally adjusted, periodic drive of the marginal actuators 53 and the central actuator 53, a transport of fluid into the chamber via one aperture 54 and out of the chamber via another aperture 54 is thus caused, by which the pump can be used for fluid transport.

However, the above-described pump is only one area for which the chamber(s) of the invention can be used. Other intended uses have already been mentioned above, such as the use as filter chamber, sensor chamber or for the generation of aerosols.

Figure 9:
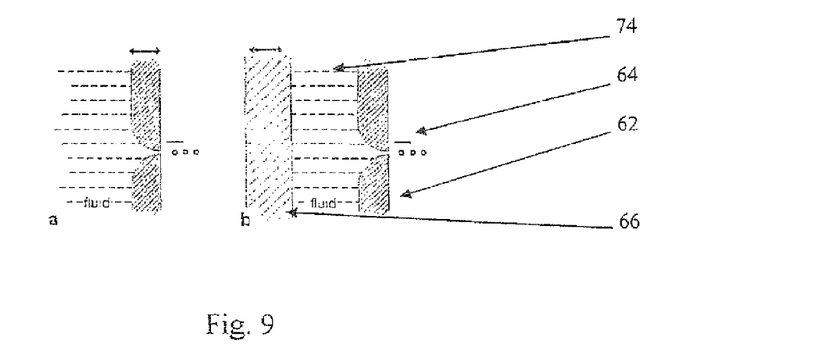
FIGS. 9a and 9b showing principle sketches to explain the function of an oscillating membrane for the generation of aerosols.

FIGS. 9a and 9b show principle sketches to explain the function of an oscillating membrane for the generation of aerosols. One or a plurality of similar apertures 64 with a small outlet diameter (preferably within a range of 1 to 10 μm) are provided in a chamber wall 62 and are in contact with a fluid 74 contained in the chamber. The outside of the chamber is open to the atmosphere. For the generation of aerosols, the fluid 74 is subjected to pressure variations generated by fast oscillations of a chamber wall. Preferably, the chamber wall 62 oscillates, in which the apertures 64 are contained (FIG. 9*a*) or a wall 66 arranged directly opposite the apertures (FIG. 9*b*). The pressure variations drive the fluid 74 through the apertures 64 in the form of small droplets, thus generating an aerosol on the atmosphere side.

FIGS. 10*a* and 10*b* show cross-sectional views of chambers of different embodiments for the generation of aerosols. In the embodiment shown in FIG. 10*a*, one or a plurality of small apertures 64 are provided in the first chamber half 10. An actuator 70 for the generation of pressure oscillations is realized by a bimorphous combination of the first chamber half 10 with a piezoelectric ring 72. The actuator 70 is excited by an alternating voltage in the ultrasound frequency range (typical frequencies 40 to 200 kHz), preferably in the vicinity of a mechanical resonance of the chamber. The chamber is at least in part filled with a fluid 74 such that the apertures 64 are at least wetted with the fluid 74. According to a further embodiment, the small apertures 64 can also be disposed in the second chamber half 12 which is provided for this purpose optionally with a thin wall segment 78 (FIG. 10*b*). In this case, the actuator 71 can either be configured as is the actuator shown in FIG. 10*a* or the piezoelectric ring 72 can be substituted e.g. by a piezoelectric disc 73 since no aperture of the piezo member is necessary in such an embodiment.

The invention is not restricted to the described embodiments, but can be modified within the scope of the following patent claims.

The invention claimed is:

1. A chamber comprising a first half and a second half,
- the first and the second halves being connected to one another by a closed connecting seam in a surface-to-surface relation,
- at least one of the two halves having at least one aperture lying within the connecting seam,
- at least the second half being thermally deformed within the closed connecting seam in such a manner that it is formed to bulge relative to the connecting surface with the first half such that a hollow space is formed between the first and second halves, and
- the second half has at least one deformation seam lying within the connecting seam.

2. A chamber according to claim 1, in which the connecting seam is a weld seam.

3. A chamber according to claim 1, having at least one closed deformation seam.

4. A chamber according to claim 1, having at least one open-formed deformation seam.

5. A chamber according to claim 1, in which at least one deformation seam is a laser shaping seam.

6. A chamber according to claim 1, in which the first and the second halves have a thickness perpendicular to the surface thereof, the thickness of the first half being less than that of the second half.

7. A chamber according to claim 1, in which the first half can be elastically deflected in the direction perpendicular to the surface thereof, relative to the second half.

8. A chamber according to claim 7, in which the bulge of the second half is adapted to the maximum deflection of the first half.

9. A chamber according to claim 7, in which the first half is connected to a piezoelectric member with which the deflection of the first half can be controlled.

10. A chamber according to claim 1, in which the first half and/or the second half consists of metal.

11. A chamber according to claim 1, in which a valve is arranged in fluid connection with the aperture of the second half.

12. A pump comprising a chamber according to claim 1.

13. A pump comprising a plurality of chambers according to claim 1, at least two of the chambers being in fluid connection with each other.

* * * * *